(12) United States Patent
Wallaker

(10) Patent No.: US 7,156,664 B2
(45) Date of Patent: Jan. 2, 2007

(54) DUMMY MEDICAL INSTRUMENT FOR USE IN A SIMULATOR

(76) Inventor: Daniel Wallaker, 94 New Road, Great Wakering (GB)

( * ) Notice: Subject to any disclaimer, the term of this patent is extended or adjusted under 35 U.S.C. 154(b) by 202 days.

(21) Appl. No.: 10/500,410

(22) PCT Filed: Dec. 20, 2002

(86) PCT No.: PCT/GB02/05844

§ 371 (c)(1),
(2), (4) Date: Jun. 24, 2004

(87) PCT Pub. No.: WO03/058583

PCT Pub. Date: Jul. 17, 2003

(65) Prior Publication Data

US 2005/0042588 A1  Feb. 24, 2005

(30) Foreign Application Priority Data

Jan. 8, 2002 (GB) ................... 0200325.9
Jun. 18, 2002 (GB) ................... 0213981.4

(51) Int. Cl.
*G09B 23/28* (2006.01)

(52) U.S. Cl. .................................... 434/262
(58) Field of Classification Search ............. 434/262, 434/267, 268, 270, 272, 274
See application file for complete search history.

(56) References Cited

U.S. PATENT DOCUMENTS 6,106,301 A * 8/2000 Merril ..................... 434/262
6,113,395 A * 9/2000 Hon ........................ 434/262
6,135,947 A * 10/2000 Watanabe et al. ........ 600/178
6,470,302 B1 * 10/2002 Cunningham et al. ....... 703/7
6,654,000 B1 * 11/2003 Rosenberg ............... 345/156
6,863,536 B1 * 3/2005 Fisher et al. ............. 434/272
6,902,405 B1 * 6/2005 Irion et al. ............... 434/272
6,929,481 B1 * 8/2005 Alexander et al. ........ 434/262
7,056,123 B1 * 6/2006 Gregorio et al. .......... 434/272
7,060,025 B1 * 6/2006 Long et al. .............. 600/106

FOREIGN PATENT DOCUMENTS

GB    2 252 656 A    8/1992
WO    WO 01 8881 A   11/2001

\* cited by examiner

*Primary Examiner*—Kurt Fernstrom
(74) *Attorney, Agent, or Firm*—Luedeka, Neely & Graham, PC

(57) ABSTRACT

A dummy medical instrument for connection to a force feedback mechanism. The dummy medical instrument having a number of cables 5, 8 extending around control knobs 1, 2. In a real instrument corresponding to the dummy instrument, the cables would extend to the tip of the instrument to allow controlled flexing of the tip of the instrument. In the dummy medical instrument, the same cables are routed down the umbilical of the instrument for connection to force feedback motors simulating the forces felt on the tip of the instrument.

8 Claims, 2 Drawing Sheets

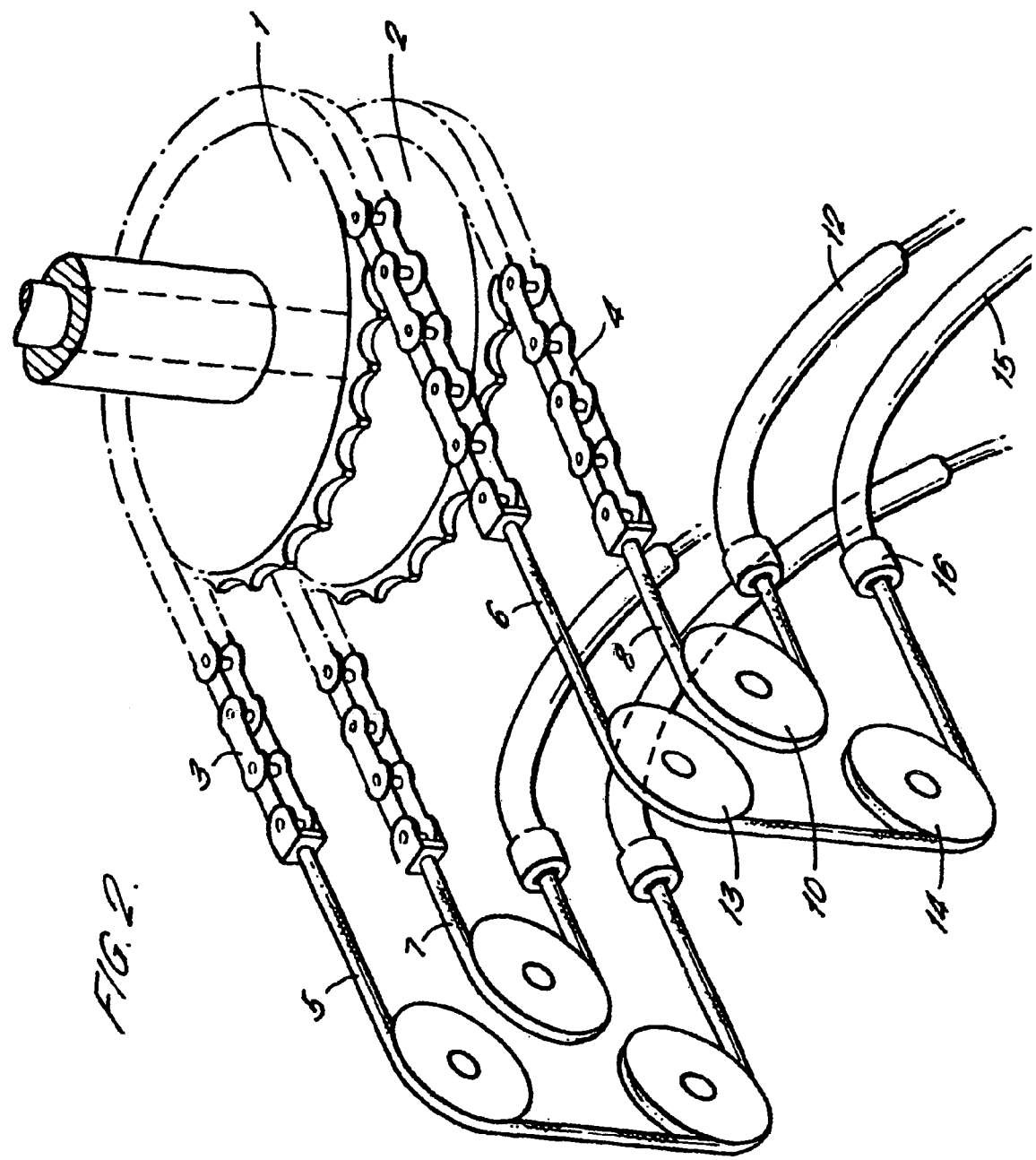

DUMMY MEDICAL INSTRUMENT FOR USE IN A SIMULATOR

The present invention relates to a dummy medical instrument for use in a simulator.

One type of simulator to which the present invention is applicable is that disclosed in GB A 2252656. This simulator simulates the operation of an endoscopic process. A dummy endoscope is insertable into a fixture which is provided with a sensor mechanism to sense the longitudinal and rotational movement of the dummy endoscope. This information is fed to a controller which generates force feedback information based on virtual model data held in the computer memory. The force feedback applied to the dummy endoscope is synchronised with a visual representation of the procedure so as to provide a realistic simulation providing a useful training tool to endoscope users.

With an instrument such as an endoscope, the tip of the endoscope is manipulated by angulation control in the form of one or more control knobs on the handle of the endoscope which are linked to cables which extend down the insertion tube of the endoscope. Turning of the control knobs produces a corresponding movement of the cable and hence the tip. An endoscope can have two control knobs one of which controls the left/right movement of the tip and the other of which controls the up/down movement of the tip.

According to the present invention there is provided a dummy medical instrument for use in a simulator, the instrument comprising a control body with user manipulatable angulation control, an insertion tube and an umbilical extending from the control body, wherein in a real instrument corresponding to the one being simulated, at least one angulation cable would extend from the user manipulatable controls to the tip of the insertion tube such that movement of the angulation control changes the angulation of the tip, and wherein in the dummy medical instrument the angulation cable extends from the user manipulatable angulation control and down the umbilical to a device for controlling the resistance to movement of the cable to provide force feedback simulating the force which would be felt at the angulation control of a real instrument.

With this arrangement, force feedback is provided to the angulation control whilst using the angulation control and cable of the real instrument (albeit with the cable being routed differently). This not only provides a realistic feel, but also has the advantage that fewer original components need to be designed for the dummy instrument which also has benefits in terms of supplying users with replacement parts.

In the real instrument, the cables extend away from the angulation control in the direction along the insertion tube. One option for the present invention is to reroute the cables completely so that they extend away from the angulation control in the direction of the umbilical. However, the current preference is for the cable to extend away from the angulation control towards the insertion tube as in the real body, and to be turned back on itself to reroute it along the umbilical. There is limited space available in the control body, and this approach provides the best way of routing the cables without interfering with other components in the control body.

Within the constraints of the normal instrument, there is very little space available to turn the cable back on itself so that it is difficult to avoid generating undesirable friction which can distort the force feedback and cause premature wear of the cable. Therefore, preferably the cable extends from the control body and around a pulley where it is turned through substantially 180° before being routed down the umbilical.

The use of the pulley eliminates sliding friction on the cable where it is turned back on itself. This provides not only smoother operation of the force feedback system, but also reduces the wear on the cable.

Preferably, the angulation cable is a co-axial cable in which a central wire is moveable within a sleeve. The sleeve is preferably removed for the portion of the cable surrounding the pulley, such that the wire engages directly with the pulley.

When more than one angulation cable is used, each cable should be provided with its own pulley system. In one particularly advantageous arrangement, a first cable is wrapped around a single pulley, while a second cable is wrapped around a pair of pulleys which are spaced apart so that the second cable forms a loop outside of the loop formed by the first cable.

In order to retain the cable on the pulley, the or each pulley preferably has a convex periphery, and at least a part of the periphery of the pulley is provided adjacent to the facing wall of a pulley housing.

An example of a dummy medical instrument constructed in accordance with the present invention will now be described with reference to the accompanying drawings, in which:

FIG. 2 is a schematic perspective view showing the arrangement of pulleys, cables and angulation control.

Figure 1:
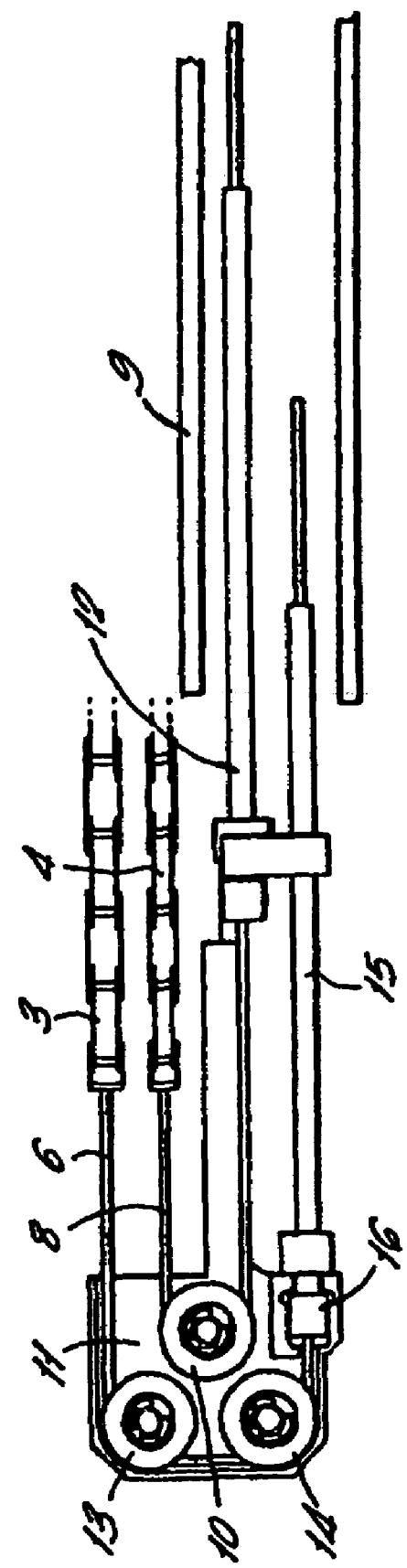
FIG. 1 is a plan view of the angulation system.

The particular medical instrument being described here is an endoscope. However, it may be any medical instrument where cables which are normally manipulated to move a part of the instrument have to be rerouted so that force feedback can be applied to the cable.

The described arrangement is adapted from a conventional endoscope control body. Both of the real and dummy endoscopes have an insertion portion leading from the control body ending at the endoscope tip. In the real instrument, this tip is manipulated to steer it through the colon. An umbilical is provided in both the real and dummy endoscopes leading from the control body to feed various cables to the control body.

The control body is provided with a pair of co-axial rotatable knobs 1,2 as shown in FIG. 2. The outer knob 1, in this case, would, in a normal endoscope, be rotated to move the tip in an up/down direction, while the inner knob 2 would move the tip in a left/right direction orthogonal to the up/down direction. These described directions are only notional directions as, in use, the endoscope may be used in any orientation. Wrapped around each pulley is a wire chain drive 3,4 to each of which a cable is attached. In the illustrated example there are four cables which, for convenience, are denoted up cable 5, down cable 6, left cable 7 and right cable 8.

In a normal instrument, these cables 5,6,7,8 would extend all the way to the tip of the endoscope to provide the tip movement referred to above upon rotation of the knobs 1,2.

In the dummy instrument, these cables must be rerouted along the umbilical of the instrument which directs them to an angulation feedback controller. In the angulation feedback controller, the up/down cables 5,6 are connected to opposite sides of a force feedback motor and the left/right cable 7,8 are connected to a similar motor.

Rotation of the knobs 1,2 is detected and a system controller interprets this information together with information on the longitudinal and rotational positions of the tip of the endoscope. Using data representing a simulated model of a colon, software detects when the simulated tip of the endoscope comes into contact with the simulated colon wall. At this time, the controller sends a force feedback signal to the two feedback motors which hence provides a resistance to the movement of the cables 5–8 which is felt at the knobs 1,2 as a resistance to turning.

In order to route each cable into the umbilical 9, the arrangement shown in FIGS. 1 and 2 is employed. FIG. 1 shows the rerouting of two of the cables, namely the down cable 6 and the right cable 8. A similar arrangement is provided on the opposite side of the control body as shown in FIG. 2. However, as this has the same construction and operation as the down/right configuration shown in FIG. 1, only this configuration is described in detail. The right cable 8 is connected to the chain 4 that surrounds the inner knob 2. This cable then extends around a first pulley 10 rotatably mounted on a housing 11 within the control body. The pulley 10 turns the right cable through 180°. A sheath 12 is connected to the housing 11. The cable 8 enters the sheath 12 at this point and is guided within this sheath into the umbilical which leads it to the feedback motor.

The down cable 6 passes in a loop outside the right cable 8 around a pair of spaced pulleys 13,14 rotatably mounted on the housing 11. The down cable 6 enters a sheath 15 attached to the housing 11 at connector 16 and is also guided into the umbilical to the other force feedback motor as described with reference to the right cable.

The invention claimed is:

1. A dummy medical instrument for use in a simulator, the instrument comprising a control body with a user manipulatable angulation controller, an insertion tube, and an umbilical extending from the control body, wherein an angulation cable extends from the user manipulatable angulation controller, and down the umbilical to a device adapted to control the resistance to movement of the cable to provide force feedback simulating a force at the controller.

2. An instrument according to claim 1, wherein the cable extends from the control body and around a pulley where it is turned through substantially 180 ° before being routed down the umbilical.

3. An instrument according to claim 1, wherein the angulation cable is a co-axial cable in which a central wire is moveable within a sleeve.

4. An instrument according to claim 3, wherein the sleeve is removed for the portion of the cable surrounding the pulley, such that the wire engages directly with the pulley.

5. An instrument according to claim 1, wherein more than one cable is provided.

6. An instrument according to claim 2, wherein more than one cable is provided and each cable has its own pulley system.

7. An instrument according to claim 6, wherein a first cable is wrapped around a single pulley, while a second cable is wrapped around a pair of pulleys which are spaced apart so that the second cable forms a loop outside of the loop formed by the first cable.

8. An instrument according to claim 2, wherein the pulley has a convex periphery, and at least a part of the convex periphery of the pulley is provided adjacent to a facing wall of a pulley housing.

* * * * *